US008328517B2

(12) United States Patent
Liang

(10) Patent No.: US 8,328,517 B2

(45) Date of Patent: Dec. 11, 2012

(54) TURBINE AIRFOIL COOLING SYSTEM WITH DIFFUSION FILM COOLING HOLE

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 941 days.

(21) Appl. No.: 12/338,152

(22) Filed: Dec. 18, 2008

(65) Prior Publication Data

US 2010/0068032 A1 Mar. 18, 2010

Related U.S. Application Data

(60) Provisional application No. 61/097,324, filed on Sep. 16, 2008.

(51) Int. Cl.

| | |
|---|---|
| ***B63H 1/14*** | (2006.01) |
| ***B63H 7/02*** | (2006.01) |
| ***B63H 1/28*** | (2006.01) |
| ***B64C 11/00*** | (2006.01) |
| ***B64C 11/16*** | (2006.01) |
| ***F01D 5/08*** | (2006.01) |
| ***F01D 5/18*** | (2006.01) |
| ***F01D 5/20*** | (2006.01) |
| ***F01D 5/14*** | (2006.01) |
| ***F03D 11/02*** | (2006.01) |
| ***F04D 29/58*** | (2006.01) |

(52) U.S. Cl. ................. 416/96 R; 416/97 R; 416/231 R

(58) Field of Classification Search ................ 416/96 R, 416/97 R, 231 R See application file for complete search history.

(56) References Cited

U.S. PATENT DOCUMENTS

| | | | | |
|---|---|---|---|---|
| 4,653,983 | A | 3/1987 | Vehr | |
| 4,684,323 | A * | 8/1987 | Field | 416/97 R |
| 5,382,133 | A | 1/1995 | Moore et al. | |
| 6,183,199 | B1 | 2/2001 | Beeck et al. | |
| 6,869,268 | B2 | 3/2005 | Liang | |
| 6,918,742 | B2 * | 7/2005 | Liang | 415/115 |

* cited by examiner

*Primary Examiner* — David Zarneke

(57) ABSTRACT

A cooling system for a turbine airfoil of a turbine engine having at least one diffusion film cooling hole positioned in an outer wall defining the turbine airfoil is disclosed. The diffusion film cooling hole includes a first section extending from an inner surface of the outer wall into the outer wall, a second section extending the first section toward an outer wall, and a third section extending from the second section and terminating at an outer surface of the outer wall. The diffusion film cooling hole may provide a metering capability together with diffusion sections that provide a larger film cooling hole breakout and footprint, which create better film coverage and yield better cooling of the turbine airfoil. The diffusion film cooling hole may provide a smooth transition, which allows the film cooling flow to diffuse better in the second and third sections of the diffusion film cooling hole.

17 Claims, 3 Drawing Sheets

TURBINE AIRFOIL COOLING SYSTEM WITH DIFFUSION FILM COOLING HOLE

CROSS-REFERENCE TO RELATED APPLICATION

This patent application claims the benefit of U.S. Provisional Patent Application No. 61/097,324, filed Sep. 16, 2008, which is incorporated by reference in its entirety.

FIELD OF THE INVENTION

This invention is directed generally to turbine airfoils, and more particularly to cooling systems in hollow turbine airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies and turbine vanes to these high temperatures. As a result, turbine airfoils must be made of materials capable of withstanding such high temperatures. In addition, turbine airfoils often contain cooling systems for prolonging the life of the turbine airfoils and reducing the likelihood of failure as a result of excessive temperatures.

Typically, turbine airfoils contain an intricate maze of cooling channels forming a cooling system. Turbine airfoils include turbine blades and turbine vanes. Turbine blades are formed from a root portion having a platform at one end and an elongated portion forming a blade that extends outwardly from the platform coupled to the root portion. The blade is ordinarily composed of a tip opposite the root section, a leading edge, and a trailing edge. Turbine vanes have a similar configuration except that a radially outer and is attached to a shroud and a radially inner end meshes with a rotatable rotor assembly. The cooling channels in a turbine airfoil receive air from the compressor of the turbine engine and pass the air through the airfoil. The cooling channels often include multiple flow paths that are designed to maintain all aspects of the turbine airfoil at a relatively uniform temperature. However, centrifugal forces and air flow at boundary layers often prevent some areas of the turbine airfoil from being adequately cooled, which results in the formation of localized hot spots. Localized hot spots, depending on their location, can reduce the useful life of a turbine airfoil and can damage a turbine blade to an extent necessitating replacement of the airfoil.

In one conventional cooling system, diffusion orifices have been used in outer walls of turbine airfoils. Typically, the diffusion orifices are aligned with a metering orifices that extends through the outer wall to provide sufficient cooling to turbine airfoils. The objective of the diffusion orifices is to reduce the velocity of the cooling fluids to create an effective film cooling layer. Nonetheless, many conventional diffusion orifices are configured such that cooling fluids are exhausted and mix with the hot gas path and become ineffective.

SUMMARY OF THE INVENTION

This invention relates to a turbine airfoil cooling system for a turbine airfoil used in turbine engines. In particular, the turbine airfoil cooling system is directed to a cooling system having an internal cavity positioned between outer walls forming a housing of the turbine airfoil. The cooling system may include a diffusion film cooling hole in the outer wall that may be adapted to receive cooling fluids from the internal cavity, meter the flow of cooling fluids through the diffusion film cooling hole, and release the cooling fluids into a film cooling layer proximate to an outer surface of the airfoil. The diffusion film cooling hole may allow cooling fluids to diffuse to create better film coverage and yield better cooling of the turbine airfoil.

The turbine airfoil may be formed from a generally elongated airfoil having a leading edge, a trailing edge and at least one cavity forming a cooling system in the airfoil. An outer wall forming the generally elongated airfoil may have at least one diffusion film cooling hole positioned in the outer wall and providing a cooling fluid pathway between the at least one cavity forming the cooling system and an environment outside of the airfoil. The diffusion film cooling hole may include a first section extending from an inner surface of the outer wall into the outer wall, a second section extending the first section and terminating before an outer surface of the outer wall, and a third section extending from the second section and at the outer surface of the outer wall. At least one surface defining the second section may extend outwardly from an intersection of the first and second sections towards the third section such that the at least one surface is angled way from a longitudinal axis of the at least one diffusion film cooling hole thereby increasing a size of a cross-sectional area of the second section. In addition, at least one surface defining the third section may extend outwardly from an intersection of the second and third sections towards the outer surface of the outer wall such that the at least one surface may be angled way from the longitudinal axis more than the at least one sidewall forming the second section thereby increasing a size of a cross-sectional area of the third section.

The first section may function as a metering section to control the flow of cooling fluids from the cooling system through the diffusion film cooling hole. The first section may have a consistent cross-sectional area throughout. The first section may also be cylindrical or have another appropriate configuration. The first section may have a length to diameter ratio of between about 1.5:1 to 2.5:1. The second section may be configured to diffuse the cooling fluids and to reduce the velocity of the cooling fluids. The second section, in one embodiment, may be conical. A ratio of a cross-sectional area of the second section at the intersection between the first and second sections to a cross-sectional area of the second section at the intersection between the second and third sections may be between about 2.0:1 and about 6.0:1. The at least one surface forming the second section extends from the longitudinal axis between five and fifteen degrees. A downstream surface forming a portion of the third section may be positioned at angle from a downstream surface forming the second section at between about ten degrees and about twenty degrees.

The third section may be configured to further diffuse the cooling fluids flowing from the cooling system through the diffusion film cooling hole. The third section may be generally conical. The intersection between the second and third sections may be positioned at the intersection of an upstream side of the at least one diffusion film cooling hole and the outer surface of the outer wall. In one embodiment, the diffusion film cooling hole may be angled radially outward. In particular, the longitudinal axis may be positioned such that an outlet of the second section may be positioned radially outward more than an inlet of the first section. The longitudinal axis of the at least one diffusion film cooling hole may be positioned at an angle between about 15 degrees and about 85 degrees relative to an axis in a chordwise direction. More particular, the longitudinal axis of the at least one diffusion film cooling hole may be positioned at an angle between about 35 degrees and about 55 degrees relative to the axis in a chordwise direction.

During operation, cooling fluids, such as gases, are passed through the cooling system. In particular, cooling fluids may pass into the internal cavity, enter the inlet of the first section of the diffusion film cooling hole, pass through the first section, pass through the second section, pass through the third section and exit the diffusion film cooling hole through the outlet. The first section may operate to meter the flow of cooling fluids through the diffusion film cooling hole. The second and third sections may enable the cooling fluids to undergo multiple expansion such that more efficient use of the cooling fluids may be used during film cooling applications. Little or no expansion occurs at top surface, which is the upstream side, of the diffusion film cooling hole. This configuration of the third section enables an even larger outlet of the diffusion film cooling hole, which translates into better film coverage and yields better film cooling. The second section creates a smooth divergent section that allows film cooling flow to spread out of the diffusion film cooling hole at the outlet better than conventional configurations. Additionally, the second section minimizes film layer shear mixing with the hot gas flow and thus, yields a higher level of cooling fluid effectiveness.

An advantage of the diffusion film cooling hole is that the divergent cooling hole includes compound divergent side walls configured to create efficient use of cooling fluids in forming film cooling flows.

Another advantage of the diffusion film cooling holes is that the diffusion film cooling hole minimizes film layer shear mixing with the hot gas flow and thus yields higher film effectiveness.

Yet another advantage of the diffusion film cooling hole is a larger outlet at the outer surface of the outer wall is created by the third section, which increases the size of the opening and forms a clamshell shaped opening that enables cooling fluids to spread out in multiple directions.

Another advantage of the diffusion film cooling hole is that the hole has a unique configuration that allows spanwise expansion of the streamwise oriented flow, thereby combining the best aspects of both spanwise and streamwise film cooling holes.

Still another advantage of the diffusion film cooling hole is that the diffusion film cooling hole have reduced stress concentrations where the surfaces of the third section intersect with the outer surface of the outer wall because of the elimination of the sharp corner at the intersection.

Another advantage of the diffusion film cooling hole is that the diffusion film cooling hole may be formed with laser machining that is capable of cutting through thermal barrier coatings (TBC). Use of lasers is more effective because the laser may be used to cut the hole and TBC together and thus, masking material need not be required.

Yet another advantage of the diffusion film cooling hole is that the configuration of the diffusion film cooling hole does not include a sharp corner within the hole, thereby preventing flow separation.

Another advantage of the diffusion film cooling hole is that the diffusion film cooling hole exhausts cooling fluids at a lower angle than conventional configurations, thereby forming a better film layer and higher film effectiveness.

Still another advantage of the diffusion film cooling hole is that the outlet clam shell configuration need not be eccentric with the conical hole to redistribute film cooling flow in a compound diffusion configuration, as found in sections two and three of the diffusion film cooling hole.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
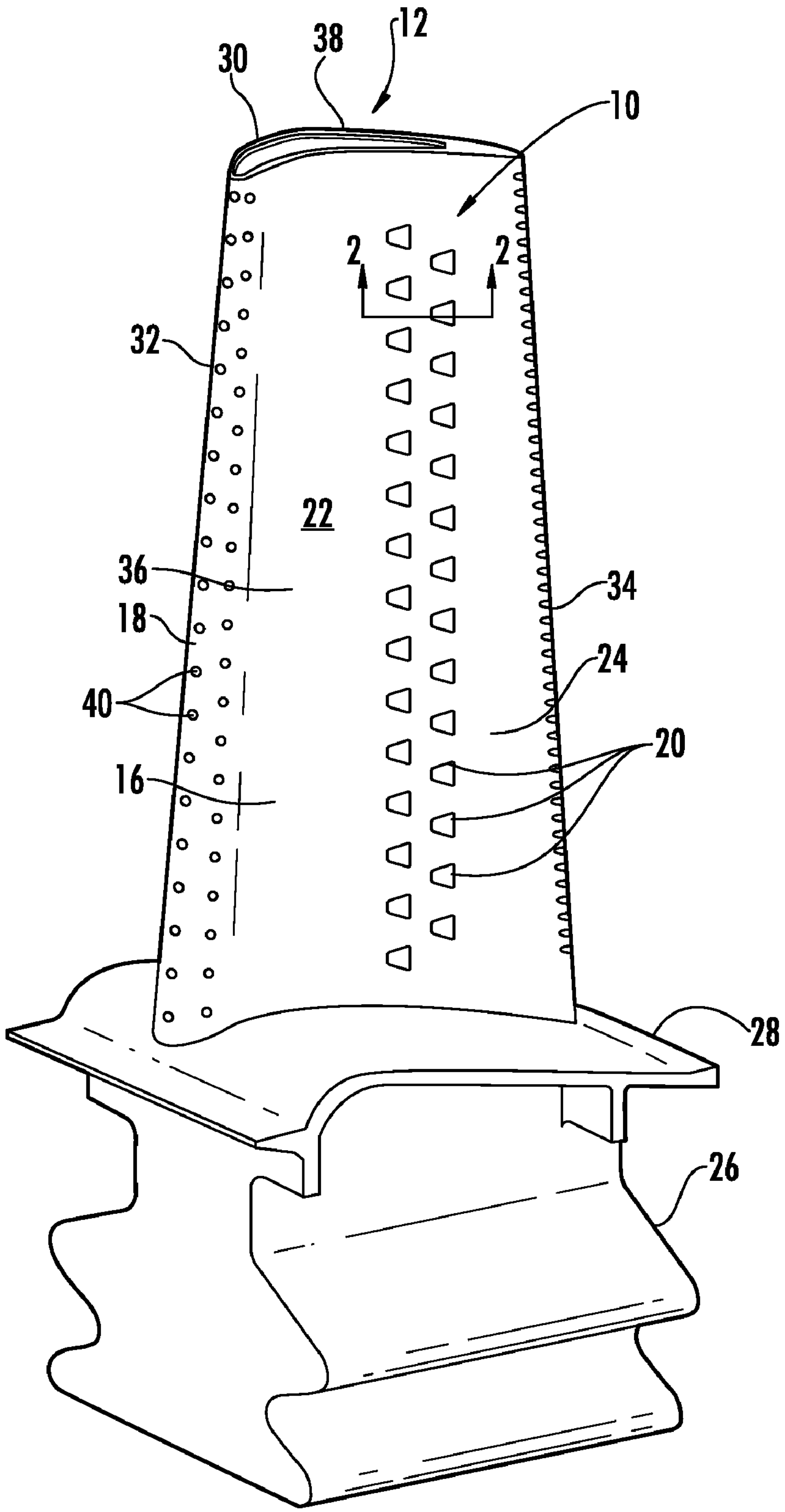
FIG. 1 is a perspective view of a turbine airfoil having features according to the instant invention.
Figure 2:
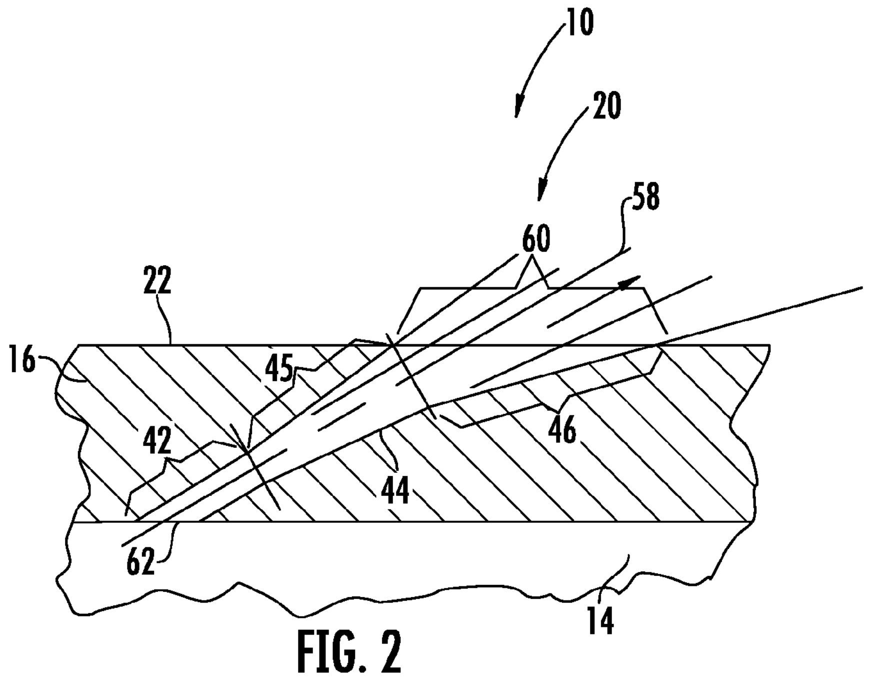
FIG. 2 is cross-sectional, detailed view, referred to as a filleted view, of a diffusion film cooling hole of the turbine airfoil shown in FIG. 1 taken along line 2-2.
Figure 3:
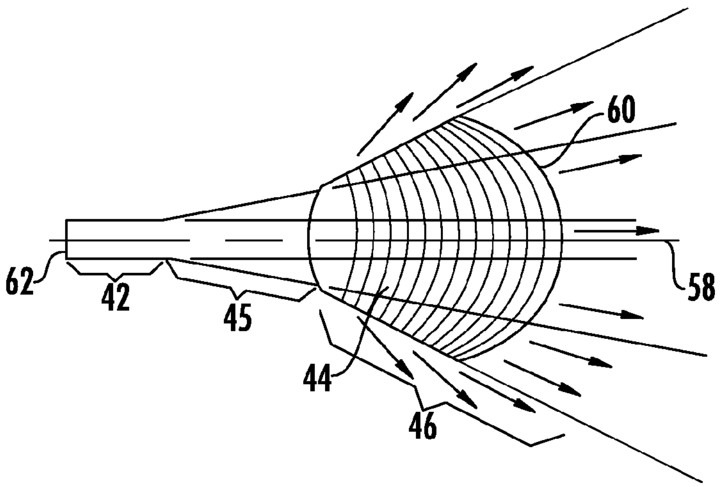
FIG. 3 is a top view of the diffusion film cooling hole of FIG. 2.
Figure 4:
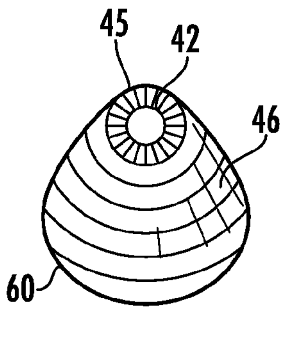
FIG. 4 is an end view of the diffusion film cooling hole looking along the longitudinal axis.
Figure 5:
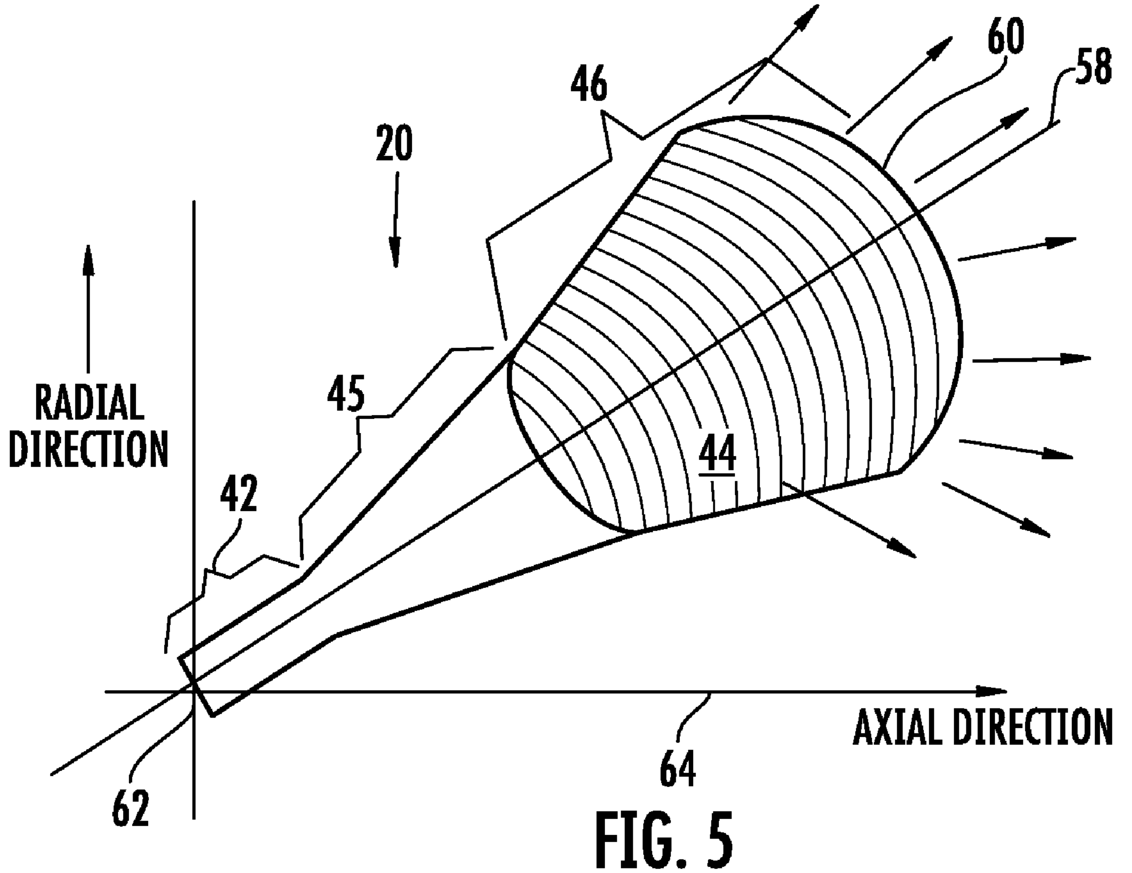
FIG. 5 is a diffusion film cooling hole in an alternative position.

As shown in FIGS. 1-6, this invention is directed to a turbine airfoil cooling system 10 for a turbine airfoil 12 used in turbine engines. In particular, the turbine airfoil cooling system 10 is directed to a cooling system 10 having an internal cavity 14, as shown in FIG. 2, positioned between outer walls 16 forming a housing 18 of the turbine airfoil 12. The cooling system 10 may include a diffusion film cooling hole 20 in the outer wall 16 that may be adapted to receive cooling fluids from the internal cavity 14, meter the flow of cooling fluids through the diffusion film cooling hole 20, and release the cooling fluids into a film cooling layer proximate to an outer surface 22 of the airfoil 12. The diffusion film cooling hole 20 may allow cooling fluids to diffuse to create better film coverage and yield better cooling of the turbine airfoil.

The turbine airfoil 12 may be formed from a generally elongated airfoil 24. The turbine airfoil 12 may be a turbine blade, a turbine vane or other appropriate structure. In embodiments in which the turbine airfoil 12 is a turbine blade, the airfoil 24 may be coupled to a root 26 at a platform 28. The turbine airfoil 12 may be formed from other appropriate configurations and may be formed from conventional metals or other acceptable materials. The generally elongated airfoil 24 may extend from the root 26 to a tip 30 and include a leading edge 32 and trailing edge 34. Airfoil 24 may have an outer wall 16 adapted for use, for example, in a first stage of an axial flow turbine engine. Outer wall 16 may form a generally concave shaped portion forming a pressure side 36 and may form a generally convex shaped portion forming a suction side 38. The cavity 14, as shown in FIG. 2, may be positioned in inner aspects of the airfoil 24 for directing one or more gases, which may include air received from a compressor (not shown), through the airfoil 24 and out one or more orifices 20, such as in the leading edge 32, in the airfoil 24 to reduce the temperature of the airfoil 24 and provide film cooling to the outer wall 16. As shown in FIG. 1, the orifices 20 may be positioned in a leading edge 32, a tip 30, or outer wall 16, or any combination thereof, and have various configurations. The cavity 14 may be arranged in various configurations and is not limited to a particular flow path.

The cooling system 10 may include one or more diffusion film cooling holes 20 positioned in the outer wall 16 to provide a cooling fluid pathway between the internal cavity 14 forming the cooling system 10 and an environment outside of the airfoil 12. The diffusion film cooling hole 20 may include a first section 42 extending from an inner surface 44 of the outer wall 16 into the outer wall 16, a second section 45 extending from the first section 42 toward the outer surface 22, and a third section 46 extending from the second section 45 and terminating at an outer surface 22 of the outer wall 16. The first section 42 may be configured to meter the cooling fluids flowing from the internal cavity 14, through the first section 42 and into the second section 45. In one embodiment, the first section 42 may include a constant geometry such that the first section 42 includes a consistent cross-sectional area. The first section 42 may be cylindrical or may be formed from linear sides. In at least one embodiment, the first section 42 may have a generally rectangular cross-section. The first section 42 may include a length to diameter ratio of between about 1.5:1 and 2.5:1.

The second section 45 may extend from the first section 42 and toward the outer surface 22 and the third section 46. The second section 45 may include an ever expanding cross-sectional area extending from the first section 42 and terminating at the third section 46. The second section 45 may provide a larger film cooling hole than conventional designs, which translates into reduced cooling fluid velocities that create improved film cooling flow with reduced disruption. The second section may be generally conical in shape growing in cross-sectional area from the intersection between the first and second sections 42, 45 to the intersection between the second and third sections 45, 46. The surface forming the second section may be positioned at an angle of between about five degrees and about fifteen degrees from the longitudinal axis 58. A ratio of the cross-sectional area at the intersection between the first and second sections 42, 45 to the cross-sectional area at the second and third sections 45, 46 is between about 2.0:1 and about 6.0:1.

The third section 46 may extend from the second section 45 and terminating at the outer surface 22. The first, second and third sections 42, 45, 46 may extend along and share the common longitudinal axis 58. The third section 46 may provide better cooling air film coverage on the outer surface 22. The third section 46 may provide a outlet 60 having a larger film cooling hole breakout 66 and footprint 68 in the outer surface 22 than conventional designs, which translates into better cooling air film coverage on the outer surface 22. The surface forming the third section 46 may be positioned such that a cross-sectional area of the third section 46 measured orthogonal to the longitudinal axis 58 increases at a faster rate moving away from the second section 45 than the rate of increase in the second section 45. In particular, the downstream surface is positioned at an angle of between about ten degrees and about twenty degrees from the downstream surface forming the second section 45. As shown in FIG. 2, the upstream side of the third section 46 may intersect with the outer surface 22 and the intersection with the second section 45.

Figure 6:
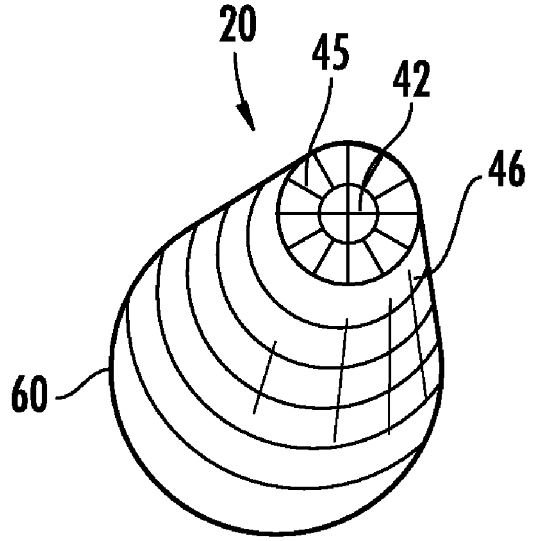
FIG. 6 is an end view of the diffusion film cooling hole of FIG. 5 looking along the longitudinal axis.

As shown in FIG. 2, the longitudinal axis 58 of the diffusion film cooling hole 20 may extend nonorthogonally through the outer wall 16. The longitudinal axis 58 of the embodiment shown in FIGS. 1-4 extends generally chordwise in the turbine airfoil, and the longitudinal axis 58 of the embodiment shown in FIG. 5 extends nonparallel and nonorthogonal relative to the leading edge 32. For instance, the longitudinal axis 58 extends nonparallel to the direction of hot gas flow across the airfoil 12. In particular, the longitudinal axis 58 may be positioned such that an outlet 60 of the third section 46 is positioned radially outward more than an inlet 62 of the first section 42. More specifically, the longitudinal axis 58 of the diffusion film cooling hole 20 may be positioned at an angle between about 15 degrees and about 85 degrees relative to an axis 64 in a chordwise direction. In another embodiment, the longitudinal axis 58 of the diffusion film cooling hole 20 may be positioned at an angle between about 35 degrees and about 55 degrees relative to the axis 64 in a chordwise direction. As shown in FIG. 6, the outlet 60 may be offset from the longitudinal axis 58 in a non-eccentric position. The second and third sections 45, 46 may be non-eccentric to the longitudinal axis 58. In such a configuration, the diffusion film cooling hole 20 may be placed such that expansion of the exhausted cooling fluids is minimized in the radial direction. This configuration prevents cooling fluids from being ejected outwardly and thereby prevents flow separation in the lower corner and prevents hot gas entrainment into the diffusion film cooling hole 20.

The diffusion cooling hole 20 may be formed from laser machining rather than EDM machining. Often times the outer surface 22 of the outer wall 16 is covered with a thermal barrier coating (TBC) and formation of the exhaust hole would require use of masking material because the EDM electrode could not cut through the TBC. Eliminating the use of EDM eliminates the need to use masking material, thereby making the formation process more efficient.

During operation, cooling fluids, such as gases, are passed through the cooling system 10. In particular, cooling fluids may pass into the internal cavity 14, enter the inlet 62 of the first section 42 of the diffusion film cooling hole 20, pass through the first section 42, pass through the second section 45, pass through the third section 46 and exit the diffusion film cooling hole 20 through the outlet 60. The first section 42 may operate to meter the flow of cooling fluids through the diffusion film cooling hole 20. The second and third sections 45, 46 may enable the cooling fluids to undergo multiple expansion such that more efficient use of the cooling fluids may be used during film cooling applications. Little or no expansion occurs at top surface, which is the upstream side, of the diffusion film cooling hole. This configuration of the third section 46 enables an even larger outlet 60 of the diffusion film cooling hole 20, which translates into better film coverage and yields better film cooling. The second section 45 creates a smooth divergent section that allows film cooling flow to spread out of the diffusion film cooling hole 20 at the outlet 60 better than conventional configurations. Additionally, the second section 45 minimizes film layer shear mixing with the hot gas flow and thus, yields a higher level of cooling fluid effectiveness.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A turbine airfoil, comprising:

a generally elongated airfoil having a leading edge, a trailing edge and at least one cavity forming a cooling system in the airfoil;

an outer wall forming the generally elongated airfoil and having at least one diffusion film cooling hole positioned in the outer wall and providing a cooling fluid pathway between the at least one cavity forming the cooling system and an environment outside of the airfoil;

wherein the at least one diffusion film cooling hole includes a first section extending from an inner surface of the outer wall into the outer wall, a second section extending the first section and terminating before an outer surface of the outer wall, and a third section extending from the second section and at the outer surface of the outer wall;

wherein at least one surface defining the second section extends outwardly from an intersection of the first and second sections towards the third section such that the at least one surface is angled way from a longitudinal axis of the at least one diffusion film cooling hole thereby increasing a size of a cross-sectional area of the second section;

where at least one surface defining the third section extends outwardly from an intersection of the second and third sections towards the outer surface of the outer wall such that the at least one surface is angled way from the longitudinal axis more than the at least one surface forming the second section thereby increasing a size of a cross-sectional area of the third section;

wherein the second and third sections are conical; and wherein the first, second and third sections are concentric with each section sharing the same longitudinal axis.

2. The turbine airfoil of claim 1, wherein the first section has a consistent cross-sectional area throughout.

3. The turbine airfoil of claim 1, wherein the first section is cylindrical.

4. The turbine airfoil of claim 3, wherein the first section has a length to diameter ratio of between about 1.5:1 to 2.5:1.

5. The turbine airfoil of claim 1, wherein a ratio of a cross-sectional area of the second section at the intersection between the first and second sections to a cross-sectional area of the second section at the intersection between the second and third sections is between about 2.0:1 and about 6.0:1.

6. The turbine airfoil of claim 1, wherein the at least one surface forming the second section extends from the longitudinal axis between five and fifteen degrees.

7. The turbine airfoil of claim 6, wherein a downstream surface forming a portion of the third section is positioned at angle from a downstream surface forming the second section at between about ten degrees and about twenty degrees.

8. The turbine airfoil of claim 1, wherein the third section is conical.

9. The turbine airfoil of claim 1, wherein the intersection between the second and third sections is positioned at the intersection of an upstream side of the at least one diffusion film cooling hole and the outer surface of the outer wall.

10. The turbine airfoil of claim 1, wherein the longitudinal axis is positioned such that an outlet of the third section is positioned radially outward more than an inlet of the first section.

11. The turbine airfoil of claim 10, wherein the longitudinal axis of the at least one diffusion film cooling hole is positioned at an angle between about 15 degrees and about 85 degrees relative to an axis in a chordwise direction.

12. The turbine airfoil of claim 11, wherein the longitudinal axis of the at least one diffusion film cooling hole is positioned at an angle between about 35 degrees and about 55 degrees relative to the axis in a chordwise direction.

13. A turbine airfoil, comprising:

a generally elongated airfoil having a leading edge, a trailing edge and at least one cavity forming a cooling system in the airfoil;

an outer wall forming the generally elongated airfoil and having at least one diffusion film cooling hole positioned in the outer wall and providing a cooling fluid pathway between the at least one cavity forming the cooling system and an environment outside of the airfoil;

wherein the at least one diffusion film cooling hole includes a first section extending from an inner surface of the outer wall into the outer wall, a second section extending the first section and terminating before an outer surface of the outer wall, and a third section extending from the second section and at the outer surface of the outer wall;

wherein the first section has an inlet that meters cooling fluid flow through the at least one diffusion film cooling hole;

wherein at least one surface defining the second section extends outwardly from an intersection of the first and second sections towards the third section such that the at least one surface on a downstream side of the at least one diffusion film cooling hole is angled way from a longitudinal axis of the at least one diffusion film cooling hole thereby increasing a size of a cross-sectional area of the second section;

where at least one surface defining the third section extends outwardly from an intersection of the second and third sections towards the outer surface of the outer wall such that the at least one surface on a downstream side of at least one diffusion film cooling hole is angled way from the longitudinal axis more than the at least one sidewall forming the second section thereby increasing a size of a cross-sectional area of the third section;

wherein the second and third sections are conical; and wherein the first, second and third sections are concentric with each section sharing the same longitudinal axis.

14. The turbine airfoil of claim 13, wherein the first section has a consistent cross-sectional area throughout.

15. The turbine airfoil of claim 13, wherein the first section is cylindrical with a length to diameter ratio of between about 1.5:1 to 2.5:1 and wherein a ratio of a cross-sectional area of the second section at the intersection between the first and second sections to a cross-sectional area of the second section at the intersection between the second and third sections is between about 2.0:1 and about 6.0:1.

16. The turbine airfoil of claim 13, wherein the at least one surface forming the second section extends from the longitudinal axis between five and fifteen degrees and wherein a downstream surface forming a portion of the third section is positioned at angle from a downstream surface forming the second section at between about ten degrees and about twenty degrees.

17. The turbine airfoil of claim 13, wherein the longitudinal axis of the at least one diffusion film cooling hole is positioned at an angle between about 15 degrees and about 85 degrees relative to an axis in a chordwise direction.

* * * * *